United States Patent [19]

Säger

[11] Patent Number: 4,852,008

[45] Date of Patent: Jul. 25, 1989

[54] METHOD AND CIRCUIT FOR PREVENTING OSCILLATIONS OF AN AUTOMOTIVE VEHICLE

[75] Inventor: Peter Säger, Friedrichsdorf, Fed. Rep. of Germany

[73] Assignee: VDO Adolf Schindling AG, Frankfurt am Main, Fed. Rep. of Germany

[21] Appl. No.: 152,710

[22] Filed: Feb. 5, 1988

[30] Foreign Application Priority Data

Feb. 12, 1987 [DE] Fed. Rep. of Germany ....... 3704316

[51] Int. Cl.[4] .............................................. B60K 26/00

[52] U.S. Cl. ................................ 364/426.01; 303/105

[58] Field of Search ...................... 364/424.01, 424.05, 364/426.01, 426.02; 303/97, 100, 105

[56] References Cited

U.S. PATENT DOCUMENTS

| | | | |
|---|---|---|---|
| 3,888,548 | 6/1975 | Sharp | 303/97 |
| 4,585,280 | 4/1986 | Leiber | 303/100 |
| 4,701,855 | 10/1987 | Fennel | 303/97 |
| 4,733,920 | 3/1988 | Pannbacker | 303/97 |

*Primary Examiner*—Gary Chin

*Attorney, Agent, or Firm*—Martin A. Farber

[57] ABSTRACT

A method and a circuit for preventing oscillations of the automotive vehicle having an engine, a controlling element controlling the output power of the engine and a desired-value transmitter, wherein, within a predetermined period of time after a rise of the desired value which is faster than takes place with a predetermined rate of rise, it is checked whether there is a decrease in the desired value which takes place faster than with a predetermined rate of decrease. In the case of the presence of a faster decrease of the desired value, the rate of rise of the desired value fed to the adjusting element is temporarily limited.

9 Claims, 2 Drawing Sheets

METHOD AND CIRCUIT FOR PREVENTING OSCILLATIONS OF AN AUTOMOTIVE VEHICLE

FIELD AND BACKGROUND OF THE INVENTION

The present invention relates to a method of preventing oscillations of an automotive vehicle having an engine, a controlling element which controls the output power of the engine and a desired-value transmitter, as well as a circuit for the carrying out of the method. As used herein, a desired value of speed is a speed value commanded by an instantaneous position of an accelerator pedal of a motor vehicle.

Particularly in the case of automotive vehicles having a strong engine and a soft drive line, oscillations can result upon the sudden giving of gas. They are increased by the fact that upon the sudden giving of gas the driver is pressed back into his seat and thereby unconsciously pulls his foot away from the gas pedal. This, in its turn, has the result that the automobile is substantially decelerated and the driver slips forward. In this connection, he again depresses the gas pedal more strongly. This is repeated several times until either the driver gives full gas, clutches or removes his foot from the gas pedal.

This so-called bonanza oscillation, which can be induced by a single sudden giving of gas, is not only experienced as extremely unpleasant but can also lead to dangerous situations in traffic.

SUMMARY OF THE INVENTION

It is an object of the present invention to prevent these oscillations without the accelerating capacity of the vehicle suffering thereby.

According to the invention, within a predetermined time after a rise in the desired speed which takes place faster than with a predetermined rate of rise, it is checked whether there is present a decrease in the desired speed which takes place faster than with a predetermined rate of decrease and, in case of the existence of a faster decrease in the desired speed, the rate of rise of the desired speed fed to the controlling element is temporarily limited.

The method of the invention has the advantage that the aforementioned oscillations are prevented without the increase in the motor power being delayed upon the sudden giving of gas. The motor power is reduced without delay also upon a sudden removal of gas. This takes place also within the time frame within which the rate of rise is limited. In this connection the threshold of the rate of rise or of decrease is selected below the value at which the so-called load-alternation jolt takes place.

The method of the invention is suitable both for gasoline engines with carburetor or injection and for diesel engines. Upon the use of the method of the invention, time constants of the vehicle in question which are controlling for the oscillations are to be taken into account.

An additional feature of the method of the invention consists in the fact that the rate of change of the desired speed is compared with a predetermined positive value and a predetermined negative value, that upon the exceeding in positive or negative direction of the respective predetermined value, a signal of, in each case, a constant duration is started and that in the event of coincidence of the signals, the rate of rise of the desired value fed to the correcting element is limited.

In this connection it is particularly advantageous if the limiting of the rate of rise of the desired value fed to an adjusting element takes place in accordance with a parabolic function. In this way a jerk is avoided upon the rapid renewed giving of gas, without, however, excessively delaying the total rise. This is obtained independently of the exact time of the renewed giving of gas in the manner that the course of the parabolic function is started by a rise in the desired value given off by the desired-value transmitter.

In accordance with another additional feature, a transfer to the unlimited feeding of the desired value to the adjusting element takes place in the manner that the course of the parabolic function is started after a predetermined period of time even without rise of the desired value.

The method of the invention can be carried out with different arrangements. Thus, for instance, the method of the invention can be carried out with a so-called electric-gas system in which the position of the gas pedal is transmitted electrically to the adjusting element. The method of the invention can, however, also be carried out with systems which have a mechanical connection between gas pedal and correcting element, which connection is acted on electrically in order to limit or reduce the engine power. In both cases a hard-wired circuit or a suitably programmed microprocessor can be provided. In the latter case there is the possibility of having the method of the invention in addition to other control or regulating tasks carried out by a microprocessor.

One advantageous circuit for the carrying out of the method of the invention consists therein that a rate-of-rise limiter (3) is arranged between the desired-value transmitter (2) and the adjusting element (4, 5), that the speed-of-rise limiter (3) has a control signal input (6); that to the desired-value transmitter (2) there is connected the input of a differentiator (7) whose output is connected to a window comparator (8); that the window comparator has two outputs (9, 10) at which signals are present as a function of whether the input voltage of the window comparator (8) exceeds a positive threshold and/or drops below a negative threshold; that the outputs (9, 10) of the window comparator (8) are each connected, via a timing member, to the inputs of the AND circuit (13) whose output is connected, via a bistable circuit (14), an integrator (15) and a pulse-width modulator (17) to the control input (6) of the rate-of-rise limiter (3). In this connection the rate-of-rise limiter (3) can comprise another integrator (29, 31).

BRIEF DESCRIPTION OF THE DRAWINGS

With the above and other objects and advantages in view, the present invention will become more clearly understood in connection with the detailed description of a preferred embodiment when considered with the accompanying drawings, of which.

Identical parts are provided with identical reference numbers in the figures.

DETAILED DESCRIPTION OF THE PREFERRED EMBODIMENT

Figure 1:
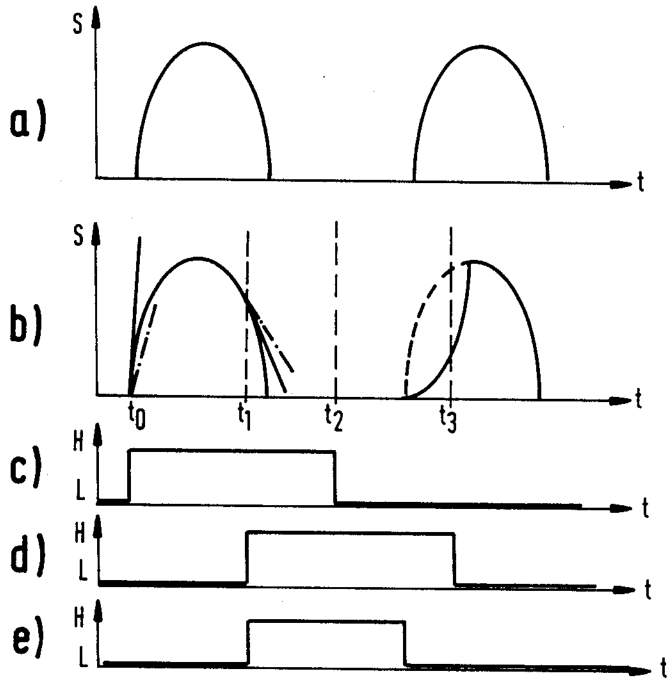
FIG. 1 is the waveform diagrams which show the desired value as a function of time.

FIG. 1(*a*) shows the variation as a function of time of the position of the gas pedal, of a control voltage which transmits the position of the gas pedal to the adjusting element, and of the position of the adjusting element, for instance the throttle valve itself. The control voltage represents the desired value for the position of the throttle valve and is produced by a desired-value transmitter which is coupled with the gas pedal. Two periods of a bonanza oscillation are shown, the throttle valve being in each case moved from the idling position into the full load position and back into the idling position where it remains until the next period commences.

The method of the invention will be explained with reference to FIG. 1(*b*). In this connection it is assumed that gas is given very rapidly at the time $t_0$. This is shown by the solid line tangent, while the dot-dash line represents a predetermined value of the rate of change of the desired value. Since in the embodiment shown the change in speed of the desired value S lies above the predetermined value, there is produced a pulse shown in FIG. 1(*c*), which continues until the time $t_2$.

At $t_1$ there is a rapid removal of gas so that the change in speed of the desired value (solid-line tangent) is greater than the predetermined value (dot-dash line). In this way a second pulse, shown in FIG. 1(*d*), is given off. As long as the rapid decrease of the desired value takes place within the time $t_0$ to $t_2$, there is temporarily conicidence between the pulses shown in FIGS. 1(*c*) and 1(*d*), which leads indirectly to the pulse shown in FIG. 1(*e*). The rear edge of this pulse is produced by the renewed giving of gas. Even if this renewed giving of gas is as sudden as represented by the dashed line in FIG. 1(*b*), a slower rise is forwarded to the adjusting element. This rise is shown as a solid line in FIG. 1(*b*).

If no renewed giving of gas should occur up to $t_3$, then the limiting of the rate of rise for the desired value is eliminated, so that a sudden giving of gas is again possible.

Figure 2:
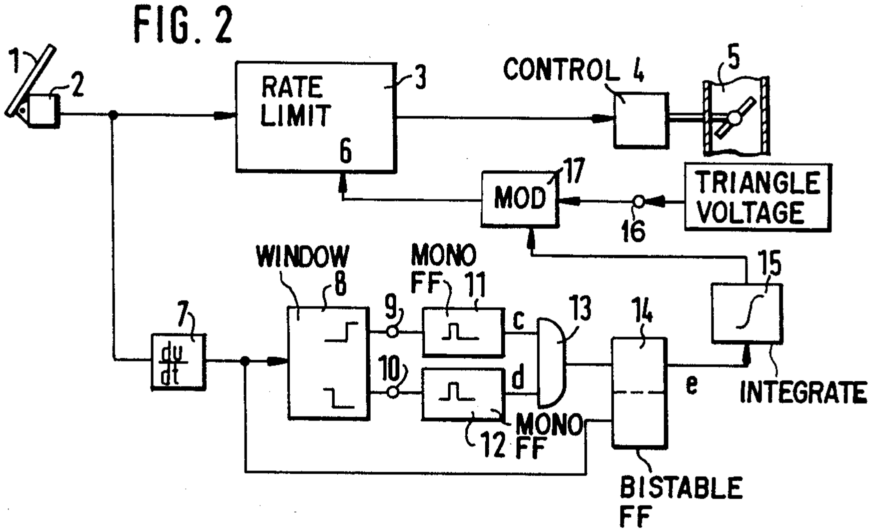
FIG. 2 is a block circuit diagram of an arrangement for the carrying out of the method of the invention.

In the case of the arrangement shown in FIG. 2, a signal representing the desired value is fed from a desired-value transmitter 2 connected to a gas pedal 1 via a rate-of-rise limiter 3 to a control circuit 4 which, corresponding to the desired value, controls a throttle valve 5 of an internal combustion engine, now shown. The rate-of-rise limiter 3 is in its nature, a low pass filter which, however, is effective only upon a rise in the desired value and only as a function of the control voltage which is fed to the input 6. A decline in the desired value is transmitted without delay, as well as an increase, if a corresponding control voltage is present at the input 6.

The output voltage of the desired-value transmitter is furthermore fed to a differentiator 7 the output of which is connected to a window comparator 8 which, in its turn has two outputs 9, 10 which are connected to corresponding inputs of a monostable trigger circuit 11, 12. An output of each of the monostable trigger circuits 11, 12, is connected to the inputs of an AND circuit 13.

The output voltage of the differentiator 7 corresponds to the rate of change of the desired value. Upon the depressing of the gas pedal 1 a negative pulse is produced, while release of the gas pedal results in a positive pulse. The faster the gas pedal is moved, the greater the amplitudes of the pulses. If the movements are sufficiently fast then the amplitude of the negative pulse exceeds a negative threshold present in the window comparator 8 while a positive threshold is exceeded if the gas pedal is released sufficiently suddenly.

By means of the output pulses of the window comparator, the two monostable trigger circuits 11, 12 are brought into the unstable condition so that there are produced at the outputs the pulses shown in FIGS. 1(*c*) and (*d*) which have a predetermined width and the lead edge of which depend on the time of the occurrence of the corresponding movement of the gas pedal. In this connection, in a preferred embodiment the width of the output pulse of the monostable trigger circuit 11 is about 200 ms, while the other output pulse is of lesser width.

By the connecting of two pulses by means of the AND circuit 13 the following then takes place: In case of slow movements of the gas pedal the thresholds are not exceeded in positive or negative direction in the window comparator, so that no output signals occur there. If the pedal is depressed rapidly, then the monostable trigger circuit 11 is set. If, within the duration of the output pulse of the monstable trigger circuit 11 the gas pedal is suddenly released, then the monostable trigger circuit 12 will also be set within this time, so that for a certain period of time both pulses will be present at the inputs of the AND circuit 13 and an output pulse will be produced. Upon subsequent sudden release of the gas pedal no coincidence arises and thus also no limiting of the rate-of-rise of the desired value.

The output signal of the AND circuit 13 is fed to a set input of a flip-flop 14 the reset input of which is connected to the output of the differentiator 7. The output signal (FIG. 1(*e*)) of the flip-flop 14 controls an integrator 15 whose output signal again modulates, by means of a pulse width modulator 17, a triangular voltage fed at 16. The pulse-width modulated pulses are fed to the control input 6 of the rate-of-rise limiter 3. As will be explained in greater detail in connection with FIG. 3, the flip-flop 14 serves to place the circuit in a condition of rest upon each giving of gas, even if it does not take place so rapidly that a bonanza oscillation is induced. Merely for a predetermined period of time after the sudden giving of gas and the sudden removal of gas shortly thereafter is the rate-of-rise limiter 3 so controlled by means of the integrator 15 and the pulse-width modulator 17 that the desired value rises slowly corresponding to a predetermined function even in the event that gas is suddenly given shortly thereafter.

Figure 3:
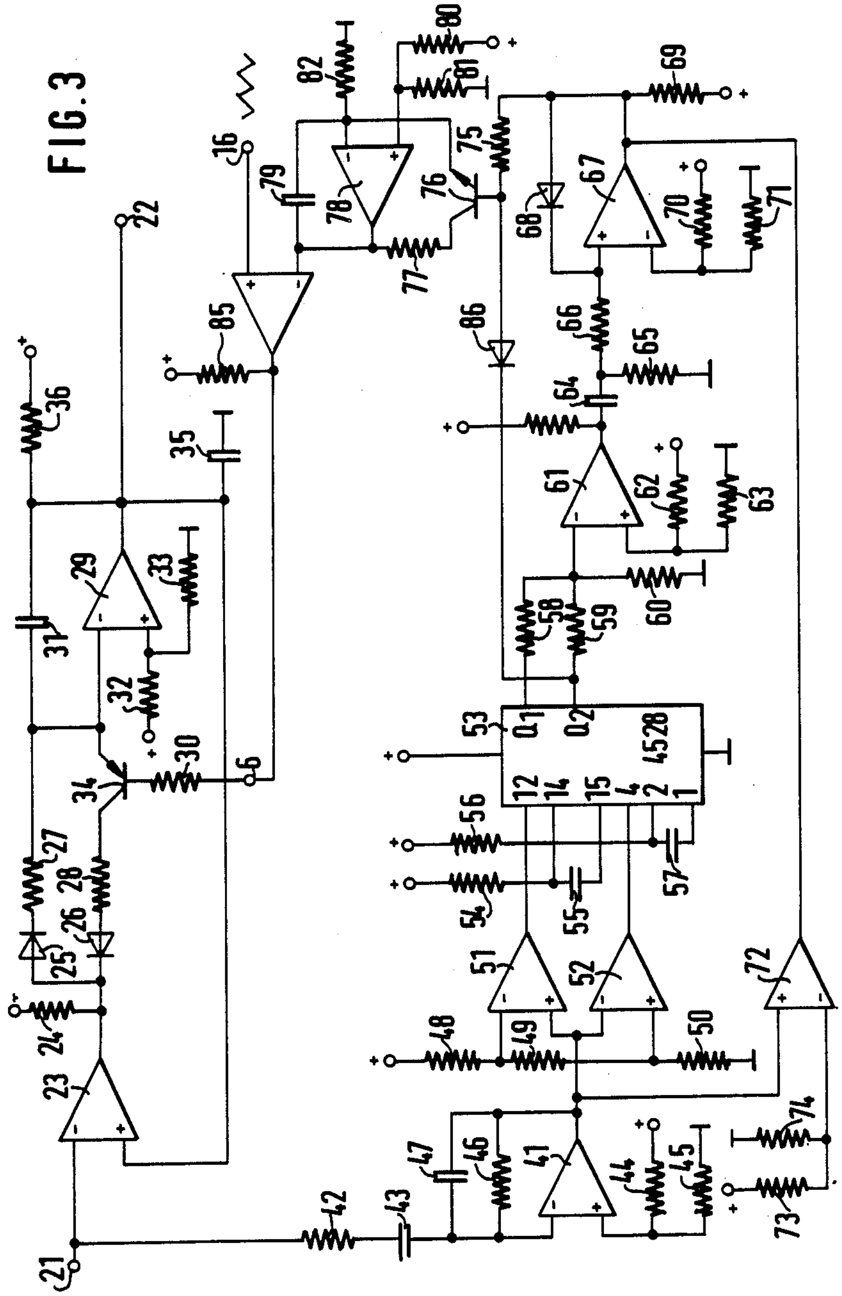
FIG. 3 is a more detailed showing of the circuit of FIG. 2.

FIG. 3 shows a more detailed circuit diagram of the circuit shown as a block diagram in FIG. 2. The input 21 is connected to the output of the desired-value transmitter 2 (FIG. 2), while the output 22 is connected to the control circuit 4 (FIG. 2). The input voltage is fed to the inverting input of an operational amplifier 23 whose output is connected, via a resistor 24, with positive operating voltage and, via two series circuits each consisting of a diode 25, 26 and a resistor 27, 28, to the inverting input of another operational amplifier 29. In the branch formed of the diode 26 and the resistor 28 there is inserted a transistor 34 which is controlled via a resistor 30 by a control voltage fed at 6.

The operational amplifier 29 is connected as integrator with the capacitor 31, a constant voltage being fed to the non-inverting input via a voltage divider 32, 33. The output of the operational amplifier 29 forms the output 22 and is connected via a resistor 36 to battery voltage and via a capacitor 35 to ground potential. Furthermore, the non-inverting input of the operational amplifier 23 is connected to the output of the operational amplifier 29. By this negative feedback coupling the result is obtained that the output 22 of the voltage follows the input 21, in which connection, however, depending on the integration time constant, there is a reduction in the rate of change. The circuit is so designed that upon a drop of the desired value, the output voltage follows so rapidly that no perceptible delay occurs upon the removal of gas. An increase in the desired value is also transmitted practically without delay if the transistor 34 is conductive—and therefore the input 6 is fed a voltage which is less than the voltage at the inverting input of the operational amplifier 29 less the base-emitter voltage of the transistor 34 and the voltage drop on the resistor 30.

However, if the control voltage fed at 6 is greater—for example U+—then the transistor 34 is blocked and the voltage at the output 22 remains despite the increasing desired value. By the feeding of a pulse-width modulated signal, intermediate values for the rate of change of the output voltage can be set.

The differentiator 7 (FIG. 2) is formed in the circuit of FIG. 3 by an operational amplifier 41 the inverting input of which is connected via a series connection consisting of a resistor 42 and a capacitor 43 to the input 21. The non-inverting input receives a voltage which corresponds to half of the positive operating voltage and is produced by means of a voltage divider 44, 45. Furthermore, the operational amplifier 41 is fed back by means of a resistor 46 and a capacitor 47. At the output of the operational amplifier 41 there is produced, during a rise in the desired value, a negative voltage and during a decrease, a positive voltage, referred to the potential at the non-inverting input.

The amplitude is the higher the faster the decrease or rise takes place. The operational amplifiers 51 and 52 form a window comparator, for which purpose constant voltages of different value are fed via a voltage divider 48, 49, 50 to the inverting input of the operational amplifier 51 and the non-inverting input of the operational amplifier 52. The differentiated desired value is fed from the output of the operational amplifier 41 to the non-inverting input of the operational amplifier 51 and to the inverting input of the operational amplifier 52. Insofar as digital signals are mentioned in the following, such as, for instance, the output signals of the window comparator, a positive level is designated by H and a negative level or ground level by L.

The output voltage of the operational amplifier 52 assumes the level H if the rate of rise is greater than the predetermined value. If the desired value drops faster than at a predetermined rate then the output signal of the operational amplifier 51 assumes the level H. With these signals two monostable trigger circuits, which are formed in the embodiment shown by an integrated circuit of type 4528, are placed in the unstable state. By means of the RC members 54, 55 and 56, 57 the duration of the pulse occurring at each output Q1 and Q2 is fixed.

A network consisting of the resistors 58, 59, 60 serves, together with the operational amplifier 61 and a voltage divider 62, 63, as AND circuit 13 (FIG. 2). Adjoining the AND circuit there is the differentiating member, consisting of a capacitor 64 and a resistor 65. The pulse which is thus differentiated controls the non-inverting input of an operational amplifier 67 via a resistor 66 in such a manner that its output assumes the level H, as a result of which the diode 68 becomes conductive and maintains this condition, for which purpose operating voltage is fed over a resistor 69. The inverting input of the operational amplifier 67 receives, via a voltage divider 70, 71, a bias voltage which is equal to half the operating voltage.

The operational amplifier 67 fulfills the function of a flip-flop which is set by the pulses fed. A resetting is effected by another operational amplifier 72 the inverting input of which receives a bias voltage via a voltage divider 73, 74 and the non-inverting input of which is acted on by the differentiated desired value.

The operational amplifiers 67 and 72 have so-called open collector outputs, with the result that the level H is present simultaneously on both of them only if both operational amplifiers are controlled accordingly. A positive voltage corresponding to level H is fed via the resistor 75 to the base of a transistor 76 whose emitter-collector path lies in series with a resistor 77 between the inverting input and the output of an operational amplifier 78. Furthermore, a capacitor 79 is arranged within said negative feedback branch so that the operational amplifier 78 operates as integrator. A fixed potential is fed via a voltage divider 80, 81 to the non-inverting input, while the inverting input is connected with ground potential via a resistor 82.

The voltage at the output of the integrator tends, when the transistor 34 is non-conducting, towards an end value which corresponds to the voltage potential of the supply voltage. If this end value is fed to the inverting input of the operational amplifier 85 and a triangular voltage is fed to the non-inverting input with such a portion of dc voltage that the triangular voltage is continuously more negative than the output voltage of the operational amplifier 78, then the transistor 34 is conductive. A rapid change in the desired value fed to the adjusting element 5 (FIG. 2) is possible.

By controlling the output of the operational amplifier 67 at the level H, the transistor 76 however becomes conductive and the integrator is thus placed at a given initial value. In this connection, the voltage at the inverting input of the operational amplifier 85 is continuously more negative than the triangular voltage, so that a level H which results in a blocking of the transistor 34 is produced at the output of the operational amplifier 85.

Upon the subsequent giving of gas, the transistor 76 is brought by the output level L of the operational amplifier 72 into the non-conducting state, so that the output voltage of the integrator rises linearly to the highest possible positive potential. In this connection it passes through the voltage range of the triangular signal, so that at the output of the operational amplifier 85 there are produced pulses whose width increases linearly with time. The period of the triangular voltage is small as compared with the other time constants of the system, so that a pulse-like control of the transistor 34 becomes perceptible only continuously with increasing pulse width. If one presupposes a sudden rise of the voltage at the input 21 then the parabolic function shown in FIG. 1(*b*) is obtained from the linear rise with time of the pulse-width-like control of the transistor 34 by the action of the integrator which is formed by the operational amplifier 29. The speed of rise of the desired value fed to the correcting element is limited more strongly at first and then less so.

By the circuit shown in FIG. 3 and, in particular, by the starting of the integration process by the giving of gas itself, the result is obtained that the parabolic limitation only commences when gas is given. In this way, one avoids that upon the giving of gas (after sudden giving and removal of gas) there is a jump in the output signal or a jump in the change with time of the output signal because a transition between the uninfluenced forwarding of the desired value and the limiting of the speed of rise has been introduced already prior to the giving of gas.

For the event that the renewed giving of gas does not occur directly after the sudden giving and removal of gas, it is provided that, via a diode 86 which is connected between the output Q2 of the one monostable trigger circuit and the base of the transistor 76, the integration process is brought about even if no renewed giving of gas takes place within a predetermined time. Then no limiting of the rate of rise occurs as long as the transistor is not brought into the conductive state by sudden giving of gas and shortly thereafter removal of gas, and the integrator is thus placed at the initial value.

I claim:

1. A method of preventing oscillations of an automotive vehicle in response to sudden movements of a gas pedal, the vehicle having an engine, a controlling element which controls the output power of the engine, and a commanded value transmitter connected to the gas pedal for designating a value indicative of a commanded speed of the vehicle, the controlling element being responsive to said commanded speed value, the commanded speed value being set by displacement of the gas pedal, the method comprising the steps of checking for the presence of a sequence of events within a predetermined time interval in which there is present a fast decrease and a fast rise in said commanded speed value, wherein said fast decrease takes place at a rate faster than a predetermined rate of decrease after said fast rise in the commanded speed value, wherein said fast rise takes place at a rate faster than a predetermined rate of rise; and upon the presence of said sequence of events, temporarily limiting the rate of rise of said commanded speed value fed to the controlling element to prevent said oscillations of the vehicle.

2. The method according to claim 1, further comprising the steps of repetitively comparing, in a sequence of comparisons, a rate of change of the commanded speed value with a predetermined positive value and a predetermined negative value; and wherein, in any of said comparisons, initiating pulse signals upon the change rate exceeding the respective predetermined values in positive and negative direction, each of said pulse signals having a fixed duration; and, upon an overlapping of successive ones of said pulse signals, providing said step of limiting a rate of rise of the commanded speed value fed to the controlling element.

3. The method according to claim 2, the limiting of the rate of rise of the commanded speed value fed to the controlling element takes place in accordance with a parabolic function.

4. The method according to claim 1, wherein the limiting of the rate of rise of the commanded speed value fed to the controlling element takes place in accordance with a parabolic function of time during an interval of time in which said limiting is performed.

5. The method according to claim 3, wherein in said limiting step, the parabolic function is started by a rise in the commanded speed value given off by the commanded-value transmitter.

6. The method according to claim 5, wherein the parabolic function is started also after a predetermined period of time even without rise of the commanded speed value.

7. The method according to claim 4, wherein the parabolic function is started also after a predetermined period of time even without rise of the commanded speed value.

8. A circuit for preventing oscillations of an automotive vehicle having an engine, a controlling element which controls the output power of the engine, and a commanded-value transmitter operated by an accelerator pedal for designating a commanded speed of the vehicle, the controlling element being responsive to a commanded speed value signal outputted by the transmitter, the circuit comprising a rate-of-rise limiter connected between the commanded-value transmitter and the controlling element, the rate-of-rise limiter having a control signal input;

a differentiator connected to the commanded-value transmitter via an input of the differentiator, the differentiator providing an output voltage proportional to a rate of movement of the accelerator pedal;

a window comparator connected to an output of the differentiator for receiving the differentiator output voltage, the window comparator having a first output terminal and a second output terminal, the window comparator being operative to provide a first output signal at the first output terminal and a second output signal at the second output terminal respectively upon the differentiator output voltage exceeding a positive threshold or dropping below a negative threshold;

a first and a second flip-flop means activated by said first and said second output signals of said comparator respectively to output a first pulse signal of fixed duration and a second pulse signal of fixed duration;

an AND gate, a bistable element, a pulse-width modulator and an integrator; and wherein said first and said second pulse signal are applid to inputs of the AND gate, an output of the AND gate being connected, via the bistable element to the integrator which, in turn, is connected by the pulse-width modulator to the control input of the rate-of-rise limiter;

upon an occurrence of at least a partial overlapping of at least a portion of said first and said second pulse signals, said AND gate triggers said bistable element to apply a first voltage level to said integrator, said bistable element being reset by the output voltage of said differentiator to apply a second voltage level, different from said first voltage level, to said integrator;

said rate-of-rise limiter operates in response to pulse-width-modulated pulses of said modulator; and said integrator alters the width of the pulse-width-modulated pulses to direct the limiter to reduce a rate of change in engine output power upon the occurrence of the overlapping of the first and the second pulse signals of the flip-flop means, the overlapping indicating a condition conducive to said vehicle oscillations, the action of the integrator counteracting said vehicle ocsillations.

9. The circuit according to claim 8, wherein said rate-of-rise limiter comprises a further integrator connected between input and output terminals of the limiter.

* * * * *